(12) United States Patent
Nagai

(10) Patent No.: US 6,755,899 B2
(45) Date of Patent: Jun. 29, 2004

(54) VACUUM DEAERATION DEVICE

(75) Inventor: Akihiko Nagai, Saitama-ken (JP)

(73) Assignee: Erc, Inc., Saitama-Ken (JP)

( * ) Notice: Subject to any disclaimer, the term of this patent is extended or adjusted under 35 U.S.C. 154(b) by 0 days.

(21) Appl. No.: 09/881,574

(22) Filed: Jun. 14, 2001

(65) Prior Publication Data

US 2001/0052290 A1 Dec. 20, 2001

Related U.S. Application Data

(63) Continuation-in-part of application No. 09/303,980, filed on May 3, 1999, now abandoned.

(30) Foreign Application Priority Data

Oct. 9, 1998 (JP) ............................ 10-287471

(51) Int. Cl.[7] .............................................. B01D 19/00
(52) U.S. Cl. ...................................... 96/6; 95/46; 96/10
(58) Field of Search ............................ 95/46; 96/6, 10, 96/14

(56) References Cited

U.S. PATENT DOCUMENTS

| 3,884,885 A | 5/1975 | Grot | 260/79.3 R |
|---|---|---|---|
| 4,539,113 A | 9/1985 | Tomita et al. | 210/323.2 |
| 4,764,560 A | 8/1988 | Mitchell | 524/506 |
| 4,986,837 A | 1/1991 | Shibata | 55/190 |
| 5,183,486 A | 2/1993 | Gatten et al. | 55/159 |
| 5,205,844 A | 4/1993 | Morikawa | 55/158 |
| 5,340,384 A | 8/1994 | Sims | 96/6 |
| 5,425,803 A | 6/1995 | van Schravendijk et al. | 95/46 |
| 5,538,538 A | 7/1996 | Glatz et al. | 96/6 |
| 5,762,684 A | 6/1998 | Hayashi et al. | 95/24 |
| 5,980,742 A | 11/1999 | Saitoh | 210/198.2 |

FOREIGN PATENT DOCUMENTS

| DE | 24 37 161 A1 | 2/1975 |
| DE | 29 07 188 A1 | 8/1979 |
| DE | 43 27 582 C1 | 10/1994 |
| GB | 2 014 870 A | 9/1979 |
| JP | 2000-117073 | 4/2000 |

Primary Examiner—Robert H. Spitzer
(74) Attorney, Agent, or Firm—Darby & Darby

(57) ABSTRACT

This invention's object is to eliminate a possibility that both aromatic substances and olefin substances are resolved into deaerated liquid contacted with a transmission film. As a transmission film for allowing only gas to pass and preventing liquid from being passed therethrough, there is applied a product of high volatile characteristic in which dispersion liquid composed of single solution is added to particle plastic substrate to form paste material is extruded and baked.

1 Claim, 1 Drawing Sheet

VACUUM DEAERATION DEVICE

CROSS-REFERENCE TO RELATED APPLICATIONS

This application is a continuation-in-part of application Ser. No. 09/303,980, filed May 3, 1999, now abandoned, which is hereby incorporated by reference in its entirety.

FIELD OF THE INVENTION

The present invention relates to a vacuum deaeration device in which a transmission film for allowing only gas to pass therethrough and preventing liquid from being transmitted is mounted within a vacuum container, a pressure within the vacuum container is reduced by a vacuum pump or the like to deaerate resolved gas from liquid (deaerated liquid) contacted with the aforesaid transmission film. More particularly the invention is a vacuum deaeration device suitable for removing resolved gas from liquid (deaerated liquid) in various kinds of production process facilities, such as a liquid chromatograph as well as various kinds of physical and chemical and analytical devices, pharmaceutical engineering, semi-conductors and liquid crystals.

DESCRIPTION OF RELATED ART

Analytical processing is performed using analytical equipment, such as a liquid chromatograph device. Resolved gas is removed (deaerated) from sample liquid or solvent, or liquid to improve reliability in measurement data. A fluorine transmission film for allowing only gas to pass therethrough and preventing liquid from being transmitted is used at a location of the deaeration device in contact with the foresaid sample liquid or solvent, or liquid.

The transmission film used in this type of deaeration device is usually manufactured by a method wherein residual gasoline substances (e.g., naphtha or white oil) are added to and mixed with a powder fluorine plastic substrate to form paste. The paste material is extruded and baked under a relatively high temperature (approximately 100° C. to approximately 400° C.).

At this time, liquid of a relatively low boiling point such as the aforesaid gasoline residuals is evaporated during the baking operation and removed. However, actually, liquid of relatively low boiling point, in particular, aromatic substances and olefin substances are not completely evaporated and a relatively small amount of the substances remain in the transmission film. These remaining substances in the transmission film are freely separated when liquid (deaerated liquid) is contacted with the transmission film, resolved into deaerated liquid, and bad influence (a measurement error) is applied to the measurement result performed by the liquid chromatograph device or quality keeping controls in various kinds of production processes.

SUMMARY OF THE INVENTION

The present invention overcomes the aforesaid disadvantages as above in the prior art. Specifically, the present invention is directed to a vacuum deaeration device having no possibility that aromatic substances or olefin substances applying bad influence against the measurement result performed by analytical equipment and quality keeping controls at various kinds of production processes are resolved into liquid (deaerated liquid) contacted with the transmission film.

The vacuum deaeration device of the present invention accomplishing the aforesaid object is a vacuum deaeration device in which a transmission film for allowing only gas to pass therethrough and preventing liquid from being transmitted is mounted within a vacuum container. A pressure within the vacuum container is reduced to cause resolved gas to be deaerated from the deaerated liquid through the transmission film. Applied to the transmission film is a product of relatively high volatility in which dispersion liquid composed of a single, not containing both aromatic, and olefin substances is added to a particle plastic substrate to form a paste material that is extruded and baked.

In one preferred embodiment of the present invention, the dispersion liquid is a single solution of linear chain-like paraffin, not containing unsaturated hydrocarbon or having a volatile characteristic and not containing aromatic substances and olefin substances, while the plastic substrate is polytetrafluoroethylene (PTFE).

DETAILED DESCRIPTION OF PREFERRED EMBODIMENTS

An exemplary embodiment of the present invention is described in detail.

Figure 1:
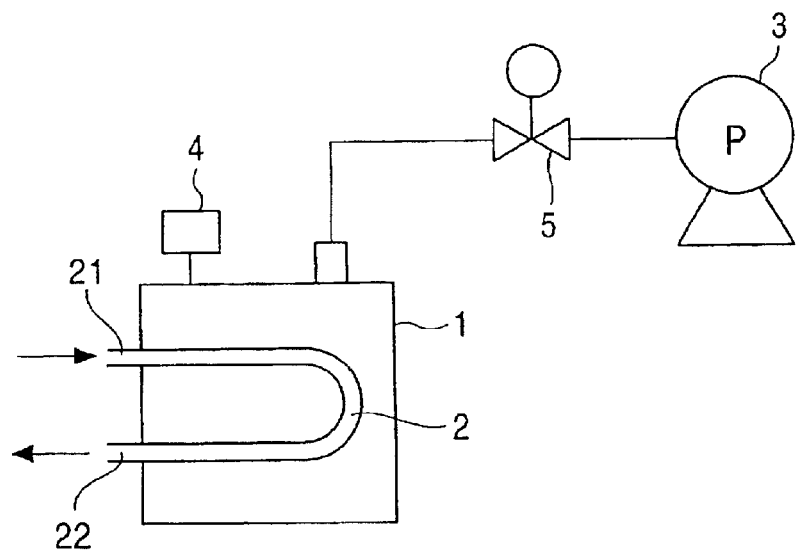
FIG. 1 is an exemplary diagram of a vacuum deaeration device in accordance with the present invention.

In FIG. 1, the vacuum deaeration device includes a vacuum container 1, a tube-shaped transmission film 2 mounted within the vacuum container 1 so as to pass only gas and prevent transmission of liquid, a vacuum pump 3 for reducing pressure inside the vacuum container 1.

In the case of the exemplary preferred embodiment shown in FIG. 1, the vacuum deaeration device is construed so that the transmission film 2 is formed into a tube with a predetermined length. One or a plurality of films are mounted within the vacuum container and at the same time a liquid inlet 21 and a liquid outlet 22 of the tube-shaped transmission film 2 is placed outside the vacuum container 1. The deaerated liquid flows from the liquid inlet 21 of the tube-shaped transmission film 2 while a pressure of the inside part of the vacuum container 1 is reduced using a vacuum pump 3. Resolved liquid is deaerated from the deaerated liquid while the liquid is discharged out of the outlet 22.

In addition, a pressure sensor 4 and a check valve 5 are operated with a specified pressure, respectively. These devices need not be arranged in a predetermined orientation. If the pressure sensor 4 or check valve 5 is mounted, then the pressure within the vacuum container 1 may be controlled in a more precise and positive manner.

The transmission film 2 of the present invention is manufactured by a method wherein dispersion liquid is added to and mixed with particle-like plastic substrate to form a paste. The plastic substrate in paste form is extruded by an extruder into a tube, a film, or a membrane, and baked at a relatively high temperature (approximately 100° C. to approximately 400° C.). The transmission film is mounted within the vacuum container 1 in such a way that may be contacted with the deaerated liquid.

In the present specification, it is assumed that the term "particle" includes a relatively fine particle.

The plastic substrate used in the manufacturing of the transmission film 2 may include fluorine to allow only gas to pass and while preventing the transmission of liquid.

Preferably, a polymer comprising fluorine such as polytetrafluoroethylene (PTFE) or fluoric ethylene propylene (FEP), or ethylene tetrafluoroethylene (ETFE) is used.

The dispersion liquid added to and mixed with particle plastic substrate is a single solution of relatively high volatility that does not comprise aromatic substances and olefin substances, such as linear chain-like paraffin substances that do not comprise non-saturated hydrocarbon. In one embodiment of the present invention, the dispersion liquid is composed of at least two substrates selected from the group of n-hexane, n-heptane, and n-octane, not containing any aromatic and olefin substances.

A polytetrafluoroethylene (PTFE) plastic substrate was used with linear chain-like paraffin substances not comprising non-saturated hydrocarbon. The liquid was added to and mixed with the particle PTFE to produce a paste PTFE. This paste PTFE was then extruded into a tube-form by an extruder and baked to attain a tube-shaped transmission film.

The tube-shaped transmission film made of PTFE is assembled into a vacuum deaeration device for use in removing (deaerating) gas in advance from sample liquid or solvent, dampening liquid at a liquid chromatograph device and then detected by gradient solution liquid chromatography. In this case of gradient solution liquid chromatography, a concentration of moving phase (solvent) is changed continuously during chromatograph operation. Contaminated substances separated in the moving phase are condensed in the gradient solution in the separating column and solved with a rate of corresponding solution agent in gradient. Accordingly, when aromatic substances having ultra-violet ray absorbing characteristics enters into a sensor, for example, ultraviolet ray absorption sensor, it may interfere with the measurement.

Figure 2:
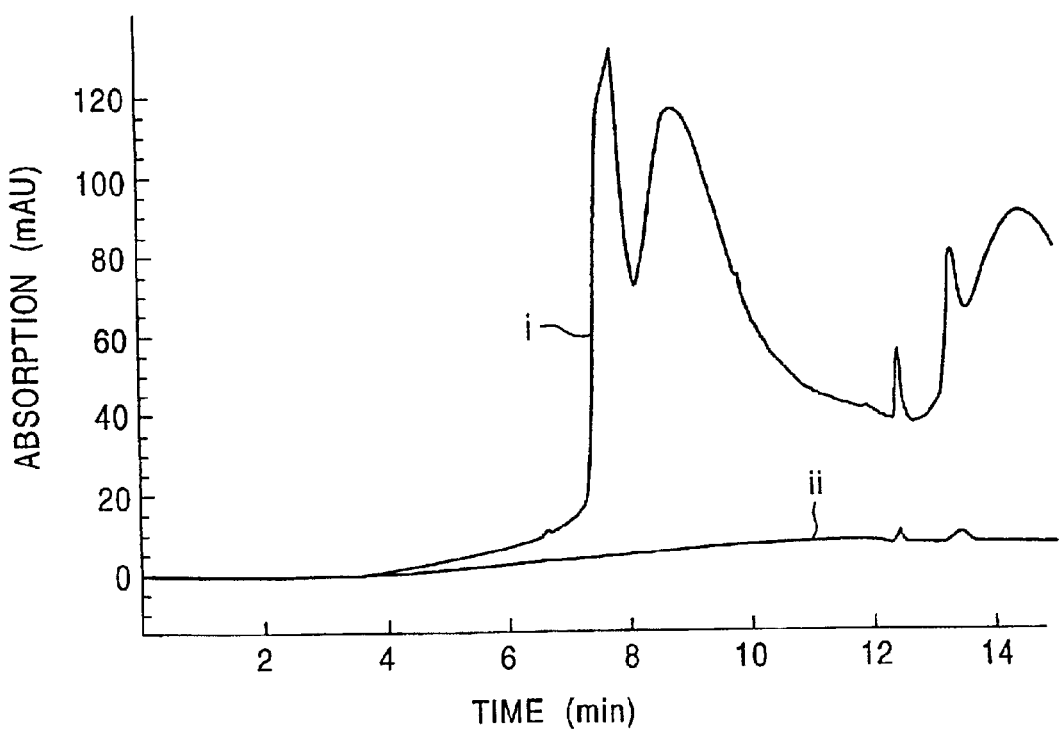
FIG. 2 is a chromatogram detected by a gradient resolved chromatography.

FIG. 2 shows a chromatogram detected by a gradient solution liquid chromatography, wherein waveform i is attained by a liquid chromatograph having a prior art PTFE tube-shaped transmission film, and waveform ii is attained by a liquid chromatograph having a PTFE tube-shaped transmission film manufactured in accordance with the present invention. As the sensing operation, a mixture of acetonitrile-water was used as the sensing operation together with, an ultra-violet ray absorbing sensor having a wavelength of 210 nm.

As is evident in FIG. 2, in waveform i contamination generating a bad influence (error) on a measurement result in the liquid chromatograph is produced when using a conventional PTFE tube-shaped transmission, whereas a substantially flat baseline ii is produced and interference is scarcely detected in a quantitative measurement of sample when using a PTFE tube-shaped transmission in accordance with the present invention.

In accordance with the vacuum deaeration device of the present invention, a dispersion liquid of relatively high volatility comprising a single solution not containing both aromatic substances and olefin substances is added to a particle plastic substrate to form a paste material. The paste material is extruded, baked and used as a transmission film for allowing only gas to pass while preventing liquid from being transmitted. Therefore, the aromatic substances and olefin substances are not originally present at the transmission film contacted with the deaerated liquid, thereby eliminating the possibility that both aromatic substances and olefin substances are freely separated and resolved into the deaerated liquid when the deaerated liquid is contacted with this transmission film. As a result, no possibility exists that a bad influence (a measurement error or the like) will be applied to a measurement result performed by the liquid chromatograph device or quality keeping control at various kinds of production processes.

An example of manufacturing of a vacuum deaeration device in accordance with the present invention is provided below.

EXAMPLE

PTFE powder, such as that manufactured by ASAHI ICI FLUOROPOLYMERS KK, was used as a plastic substrate. The plastic powder was sieved with the screen of 4–8 mesh into a container. N-Hexane as a dispersing liquid was added to the powder and the container was sealed to prevent vaporization of the dispersing paste PTFE substrate. The paste substrate was pressed in a preforming mold to remove the entrained air and to be preformed in the form of the mold.

This preform was then moved into an extrusion cylinder and extruded into a tube-like shape. The extruded substrate was subsequently moved into the drying zone in an oven. The temperature of the drying zone was controlled at approximately 60° C., which is below the boiling point of n-hexane, in the area of the inlet and continuously increased to approximately 250° C. as the substrate moved into the oven in order to diffuse and vaporize the dispersing liquid in the tube-like substrate. The tube-like substrate which removed the dispersing liquid through the drying zone was finally baked through a sintering zone at 360–390° C. to obtain a PTFE tube. Therefore, the PTFE tube did not include any aromatic or olefinic substances.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A vacuum deaeration device comprising:

a vacuum container; and a transmission film mounted in said vacuum container, said transmission film allowing only gas to pass and preventing liquid from being transmitted, pressure within said vacuum container being reduced to deaerate resolved gas from deaerated liquid through said transmission film, said transmission film being manufactured from a paste material mixture that is extruded and baked, the paste material mixture comprising (a) a dispersion liquid composed of at least two substrates selected from the group consisting of n-hexane, n-heptane, and n-octane, and (b) particle plastic substrate, wherein the dispersion liquid is free of aromatic and olefin substances.

* * * * *